United States Patent
Aiello et al.

(10) Patent No.: US 7,035,410 B1
(45) Date of Patent: Apr. 25, 2006

(54) METHOD AND APPARATUS FOR ENHANCED SECURITY IN A BROADBAND TELEPHONY NETWORK

(75) Inventors: William A. Aiello, Madison, NJ (US); Steven Michael Bellovin, Westfield, NJ (US); Charles Robert Kalmanek, Jr., Short Hills, NJ (US); William Todd Marshall, Chatham, NJ (US); Aviel D. Rubin, West Caldwell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/516,236

(22) Filed: Mar. 1, 2000

Related U.S. Application Data

(60) Provisional application No. 60/122,481, filed on Mar. 1, 1999, provisional application No. 60/129,476, filed on Apr. 15, 1999.

(51) Int. Cl.
*G06F 17/00* (2006.01)

(52) U.S. Cl. ............................ 380/247; 380/258; 726/4
(58) Field of Classification Search ................ 380/247, 380/258; 713/200; 726/4–8
See application file for complete search history.

(56) References Cited

U.S. PATENT DOCUMENTS

| | | | |
|---|---|---|---|
| 5,153,919 A * | 10/1992 | Reeds et al. ................... 380/44 |
| 5,216,715 A | 6/1993 | Markowitz |
| 5,349,642 A * | 9/1994 | Kingdon .................... 713/161 |
| 5,657,390 A * | 8/1997 | Elgamal et al. ............. 713/151 |
| 5,689,566 A * | 11/1997 | Nguyen ...................... 713/155 |
| 5,748,740 A | 5/1998 | Curry et al. |
| 5,805,702 A | 9/1998 | Curry et al. |
| 5,812,955 A | 9/1998 | Dent et al. |
| 5,970,144 A | 10/1999 | Chan et al. |
| 6,094,485 A * | 7/2000 | Weinstein et al. ............ 380/30 |
| 6,105,013 A | 8/2000 | Curry et al. |
| 6,675,216 B1 * | 1/2004 | Quatrano et al. ........... 709/229 |
| 6,681,327 B1 * | 1/2004 | Jardin ........................ 713/153 |

FOREIGN PATENT DOCUMENTS

| | | |
|---|---|---|
| DE | 4416595 A | 11/1995 |
| DE | 19521484 A | 12/1996 |
| FR | 2709903 A | 3/1995 |

OTHER PUBLICATIONS

SIP security issues: the SIP authentication procedure and its processing load; Salsano; S.; Veltri, L.; Papalilo, D.; Network, IEEE vol. 16, Issue 6, Nov.-Dec. 2002 Page(s):38-44.*

Stream authentication scheme for the use over the IP telephony; Ueda, S.; Kawaguchi, N.; Shigeno, H.; Okada, K.; Advanced Information Networking and Applications, 2004.

(Continued)

*Primary Examiner*—David Jung

(57) ABSTRACT

The broadband telephony interface is provisioned by receiving information authenticating a provisioning server, establishing a communication channel between the user and the provisioning server over which is transmitted authorization information from the user to the provisioning server, and encrypting and transmitting a cryptographic key associated with the user to the provisioning server. The cryptographic key can be a symmetric key or a public key corresponding to a private key stored in the broadband telephony interface. The cryptographic key can be utilized to generate other keys which are utilized to secure communication channels for the telephony service. The broadband telephony interface advantageously can be implemented as untrusted hardware or software that is installed by a customer.

25 Claims, 3 Drawing Sheets

OTHER PUBLICATIONS

AINA 2004. 18th International Conference on vol. 2, 2004 Page(s):164-169 vol. 2.*

A testbed for experimentation of innovative services in the B3G framework; Fresa et al.; Testbeds and Research Infrastructures for the Development of Networks and Communities, 2005. First International Conference on Feb. 23-25, 2005 Page(s)2005. Tridentcom.*

Claasen, G J et al: "Secure Communicatin Procedure for ISDN", Proceedings Southern African Conference on Communications and Signal Processing, US, IEEE,New York, NY, Jun. 24, 1988, pp. 165-170 cited as a document defining the general state of the art which is not considered to be a particular relevance in PCT International Search Report dated Oct. 06, 2000 regarding PCT International Application No. PCT/US 00/05520.

PCT International Search Report dated Oct. 06, 2000 regarding PCT International Application No. PCT/US 00/05520.

PCT Examination Report dated Jun. 12, 2001, regarding PCT International Application No. PCT/US00/05220.

* cited by examiner

METHOD AND APPARATUS FOR ENHANCED SECURITY IN A BROADBAND TELEPHONY NETWORK

CROSS REFERENCE TO RELATED APPLICATIONS

This application claims priority to U.S. Provisional Application Ser. No. 60/122,481, filed on Mar. 1, 1999, and U.S. Provisional Application Ser. No. 60/129,476, filed on Apr. 15, 1999, the contents of which are incorporated by reference herein.

This application is related to Provisional Patent Application entitled "Telephony on a Broadband Network," Ser. No. 60/071,346, filed on Jan. 14, 1998; Provisional Patent Application entitled "Telephony Over Broadband Access Networks," Ser. No. 60/073,251, filed Jan. 30, 1998; Provisional Patent Application entitled "Distributed Open Signaling Architecture," Ser. No. 60/095,288, filed Aug. 4, 1998; and Provisional Patent Application entitled "Distributed Open Signaling Architecture," Ser. No. 60/104,878, filed Oct. 20, 1998, the contents of which are incorporated herein by reference.

FIELD OF THE INVENTION

The present invention relates generally to communication networks, and more particularly to enhanced security in a broadband telephony network.

BACKGROUND OF THE INVENTION

Broadband communication networks provide a viable alternative to present local exchange carrier (LEC) loops in providing both voice and data transmission services. A variety of broadband network architectures have emerged as supporting Internet and telephony access: including cable distribution networks, ISDN (Integrated Services Digital Network), broadband ISDN, DSL ("Digital Subscriber Line"), ADSL, etc.

A major concern for such broadband communication networks is the need for adequate security measures. The system architecture must ensure user privacy across the network medium and prevent unauthorized access to services. For example, in the case of cable modems based on the Data Over Cable Service Interface Specification ("DOCSIS", a term referring to the ITU-T J.112 Annex B standard for cable modem systems), security is provided by the DOCSIS Baseline Privacy Interface ("BPI") which addresses some of the vulnerability presented by the shared cable network. BPI provides security mechanisms, including encryption using the Cipher Block Chaining (CBC) mode of the Data Encryption System (DES) and key exchange based on RSA encryption, that defend against an eavesdropping threat in the cable network. The successor to BPI, DOCSIS 1.1 Baseline Privacy Interface Plus ("BPI+") adds authentication based on digital certificates that binds media access control addresses for cable modems to RSA public keys. DOCSIS cable modems must be pre-certified with cryptographic keys and/or certificates installed in the hardware at manufacturing time. DOCSIS cable modems undergo a registration process and a baseline privacy key exchange procedure that is used to establish a secure channel with the cable modem termination system ("CMTS") at the head end. The CMTS verifies a cable modem's public key by verifying the authenticity of the certificate. Use of encryption such as provided by BPI+ is essential for a shared medium access network such as cable.

On the first hop, security measures such as DOCSIS baseline privacy are likely to be adequate. However, the actual path traversed by packets is often complex, and BPI does not provide any data privacy beyond the cable access network. The susceptibility of the public data networks such as the Internet to routing attacks—attacks where the enemy injects false route advertisements possibly to divert traffic to pass an eavesdropping station—is a concern. Quite simply, the science necessary to prevent such attacks does not exist, and it is expected to be a fair number of years before the Internet is adequately protected. In a single, well-managed IP backbone network, it may be possible to take adequate precautions against eavesdropping through good design and rigorous security procedures, though there is still a risk as the equipment and network configuration changes. When traffic traverses more than one backbone (or gets routed over other regional networks of unknown security), however, the potential for attack is greater. In the case of telephony service where ultimate delivery of packets could be via the Internet Protocol to a network not under the control of the service provider, privacy cannot be guaranteed over such paths.

Accordingly, a broadband telephony architecture with enhanced security features is needed, with the overall goals of protecting the privacy of signaling and media traffic and of preventing theft of service.

SUMMARY OF THE INVENTION

It is an object of the present invention to prevent theft of service. It should not be possible to steal another user's identification information by electronic means or to sell unlimited service by compromising customer premises equipment or injecting messages into the system. Protections should be maintained to limit service to authorized usage subject to proper accounting.

It is another object of the present invention to protect the privacy and integrity of signaling and media traffic. It should not be possible to inject signaling traffic into the network that appears to be from another source. It should also not be possible for unauthorized people to eavesdrop on traffic of other users. This includes traffic analysis by which, for example, an attacker can determine who is talking to whom.

It is another object of the present invention to protect the integrity of the called number. It should not be possible to force a called number to another number. This is necessary to prevent a range of attacks on the service, including one in which an attacker tries to steal business from a competitor by causing calls to be misrouted.

It is another object of the present invention to abide by government wiretap laws, e.g. the Communications Assistance for Law Enforcement Act of 1994 ("CALEA"). This may include supplying signaling information and media streams to the authorities. If encryption keys are mediated by the service provider, they must also be supplied to the authorities.

It is another object of the present invention to discourage denial of service attacks. It should not be easier than it is in the existing PSTN for one user or set of users to prevent other legitimate users from obtaining service.

It is another object of the present invention to provide the correct functionality of conventional telephony features. Subscriber features must function correctly. For example, caller ID information must be included in all calls due to trace requirements. Only users that subscribe to the service should have access to the information. Users should not be able to forge such information in the case of a trace.

It is another object of the present invention to provide an administrative level. There should advantageously be at least two levels of privilege to the system. This is so that decisions such as invoking emergency procedures or downloading new code to customer equipment cannot be performed by all users. For example, in an emergency, administrators must have the ability to preempt a call, while non-administrators should not have this ability.

Thus, in accordance with the present invention, an architecture for using a broadband telephony interface ("BTI") is provided with enhanced security features. The BTI registers itself with the network in a secure fashion, so that it can be authenticated and known to the network from then on. A security association is created by having the BTI generate a cryptographic key (symmetric or otherwise) and send it to the network under the public key of the network service provider. The two ends can then use this key to establish a secure connection, and the BTI can send authorization information such as a credit card number over the secure connection. The cryptographic key can then be used to derive subsidiary keys that are used for subsequent communications. By having the BTI generate its own cryptographic key, instead of having a certificate installed at manufacturing time, this allows for the possibility of a BTI implemented as software. The BTI advantageously need not be a trusted or certified box; indeed, a software package executed on a personal computer can fulfill the same functions. This is in contrast to the cable modem, for example, which must be certified to ensure correct behavior and fair access to the medium.

These and other advantages of the invention will be apparent to those of ordinary skill in the art by reference to the following detailed description and the accompanying drawings.

DETAILED DESCRIPTION

Figure 1:
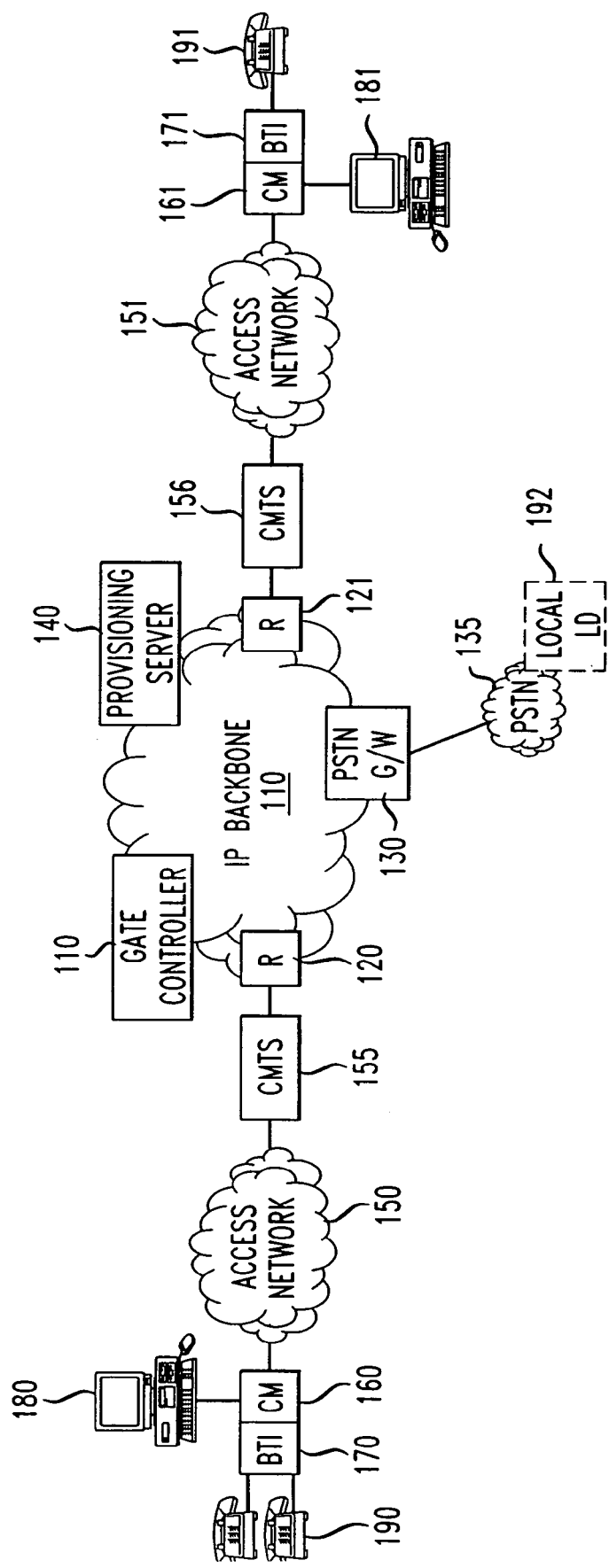
FIG. 1 is a diagram of a broadband communication network which can be utilized with an embodiment of the present invention.

With reference to FIG. 1, a diagram of a broadband communication network is shown which can be utilized with an embodiment of the present invention. A packet-switched IP backbone 100 is shown connected to access networks 150 and 151, here shown as cable distribution networks, and to a more conventional telephony network 135, here shown as the public switched telephone network ("PSTN"). A broadband telephony interface ("BTI") 170 is shown which provide a gateway between one or more telephones 190 and the packet-switched network. The BTI 170 may be physically integrated with a cable modem ("CM") 160, as shown in FIG. 1, to provide the necessary functions to interface between one or more phone lines and the depicted cable access network 150. The cable modem 160 can also be used by other communication devices 180 (in FIG. 1 shown for example as a personal computer) to connect to the access networks 150. The access network 150 terminates on a cable modem termination system ("CMTS") 155 at a head end. The CMTS 155 interfaces to an Internet Protocol ("IP") edge router ("ER") 120 that connects to a managed IP backbone 100, which provides the connectivity to other BTIs (e.g. 171 with corresponding edge router 121, CMTS 156, access network 151, cable modem 161, communication device 181, and telephone 191) and to gateways 130 to the PSTN 135. A "gate controller" 110 provides authentication, authorization, and call routing functions for calls originated by BTIs. The authentication information used by the gate controller is made available to it by a provisioning process that is described in further detail below. The backbone provides connectivity to a provisioning server 140, which is involved in provisioning the BTI and other network elements.

The particular architecture set forth in FIG. 1 is for illustration purposes only and is further described in the following commonly assigned patent applications: Provisional Patent Application entitled "Telephony on a Broadband Network," Ser. No. 60/071,346, filed on Jan. 14, 1998; Provisional Patent Application entitled "Telephony Over Broadband Access Networks," Ser. No. 60/073,251, filed Jan. 30, 1998; Provisional Patent Application entitled "Distributed Open Signaling Architecture," Ser. No. 60/095,288, filed Aug. 4, 1998; and Provisional Patent Application entitled "Distributed Open Signaling Architecture," Ser. No. 60/104,878, filed Oct. 20, 1998, the entire contents of which are incorporated herein by reference.

Note that although a limited number of network entities are shown in FIG. 1 for simplicity of presentation, other network entities can obviously be included in the network—such as additional interface units, routers, controllers, and gateways. Although FIG. 1 sets forth a particular broadband telephony architecture, one of ordinary skill in the art would recognize that the security enhancements of the present invention are readily extendible to other architectures. For example, the present invention can be utilized with broadband communication networks that do not use cable access networks but rather use digital subscriber line (DSL), Integrated Services Digital Network (ISDN), or some other access architecture. Moreover, the present invention can be utilized with other packet-switched architectures or with a hybrid network architecture.

Figure 2:
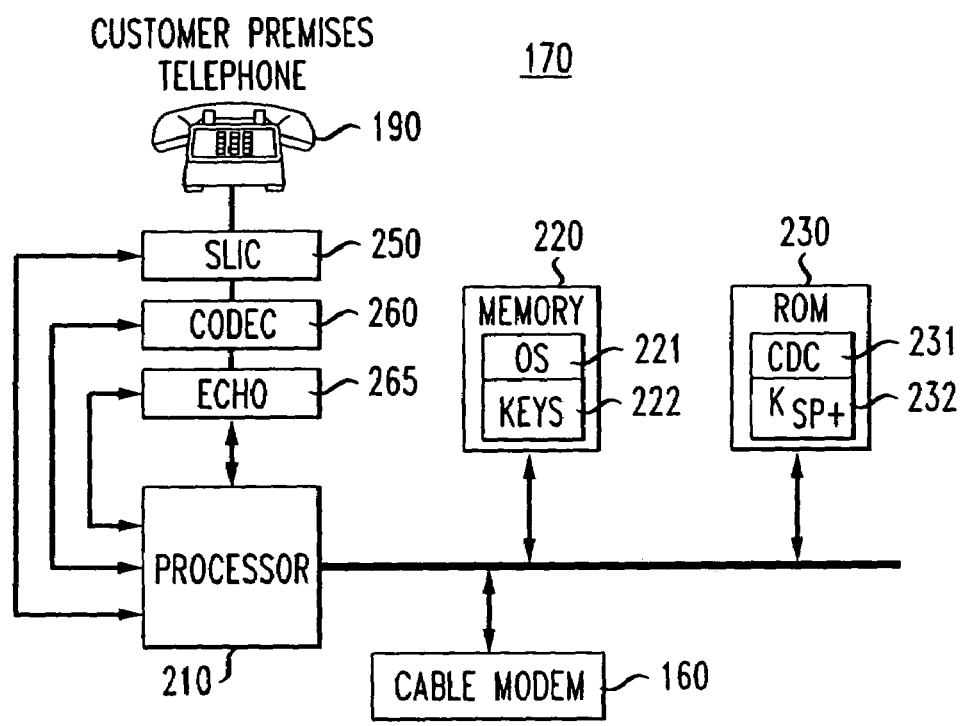
FIG. 2 is a block diagram of the components of a hardware broadband telephony interface configured for use with a preferred embodiment of the present invention.

FIG. 2 sets forth a simplified block diagram of the components of a BTI, configured for use with the present invention. The BTI performs signaling and call control functions and enables telephony service on the communication network by digitizing, compressing, and packetizing analog signals from a telephone 190 into data packets for transport over the communication network. The functions of a BTI can be implemented in many different ways that would be apparent to one of ordinary skill in the art, including as software executed on a typical computer. FIG. 2 illustrates a hardware embodiment of a BTI 170 that can be a stand-alone device, can be integrated with a telephone 190 to create a stand-alone telephony device or can be integrated with an access device (e.g. the cable modem 160 in FIG. 1 or a set top box) to form a general network interface unit. The BTI in FIG. 2 comprises a processor 210 and hardware (here shown as a subscriber line interface circuit 250, codec 260, and echo canceler 265) capable of detecting changes in state information (e.g. hook state detection), collecting dialed digits (e.g. dual tone multifrequency (DTMF) signals), and participating in the implementation of telephone features. The processor 210 has access to memory 220 which stores data such as cryptographic keys 222 and the operating system 221 and program instructions necessary for the operation of the BTI. For security purposes, it is advantageous for the BTI also to have read only memory 230 which stores code downloading code ("CDC") 232 and the service provider's public key 231, as further discussed below. It is also advantageous for some of the data and code in memory 220 to be stored in some form of non-volatile memory so that such information is not erased if power to the BTI is turned off.

The BTI 170 advantageously should be able to performing probabilistic computation, whether by hardware (e.g. a noisy diode), software (e.g. a pseudo-random generator with a good seed), or some combination. This is necessary for the BTI to be able to generate cryptographic keys and to perform related cryptographic functions such as ElGamal signatures. Without a hardware source of randomness, it will likely be necessary for the BTI 170 to maintain about 200 bytes of state for the lifetime of the device, which will need to change often. One possible embodiment would be to keep the state data in RAM memory which gets copied to nonvolatile flash memory when there is a chance of a loss of power.

As further elaborated on below, the BTI 170 need not necessarily be under the direct control of the service provider, e.g. the entity operating the communication network. The BTI, operated in accordance with the present invention, can be implemented as customer premises equipment that is untrusted and operates based on locally-stored software. The customer, in other words, can purchase the BTI at a local store or can have the device shipped to her home. Where the BTI is implemented as software, it can be simply downloaded and installed on a computer pre-configured for access to the communication network.

Provisioning

Figure 3:
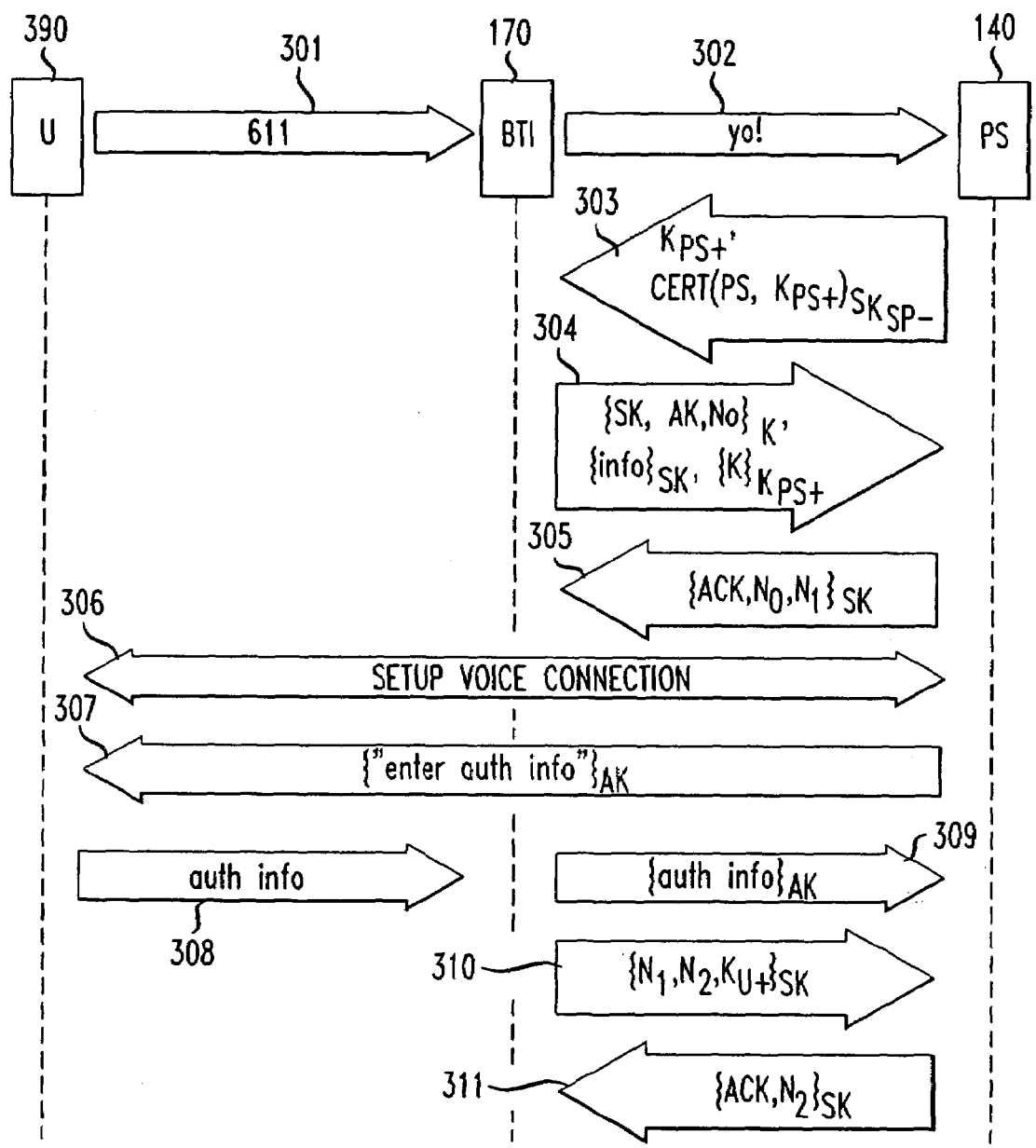
FIG. 3 is an abstract diagram of a communication provisioning protocol in accordance with a preferred embodiment of the present invention.

In accordance with a preferred embodiment of the present invention, FIG. 3 illustrates security protocols to be utilized in the provisioning of a user who wishes to utilize the network. The following notation and abbreviations are used in the discussion:

| NOTATION | DEFINITION |
|---|---|
| SP | A service provider, such as AT&T. |
| PS | A provisioning server operated by the service provider and reachable over the access network and the backbone. |
| BTI | The customer premises equipment, namely the broadband telephony interface. The cable modem is not distinguished from the BTI for purposes of the following discussion. |
| GC | The gate controller. Every BTI communicates with an assigned gate controller on the back end. |
| U | Refers to the human user. |
| $\{X\}_{S_{k-}}$ | This notation means that the message X is signed with the private portion of public key, k. It is assumed that the public portion, k+, is used to verify the signature. |
| $\{X\}_k$ | This indicates that X is encrypted under the key, k. |
| $K_{P-}$ | This represents the private key of principal, P. So, for example, $K_{SP-}$ is the private key of the service provider. |
| $K_{P+}$ | This represents the public key of principal, P. |
| $CERT(ID, k)_{S_{Kp-}}$ | This represents a public key certificate binding ID to the key k by the authority holding the private key, $K_{P-}$. We use this notation because certificates can hold a lot of other information. |
| A → B : message | This notation means that A sends message to B. |
| IKE | Internet Key Exchange. This is the Standard protocol for key management defined by the IETF. |

In the case of a cable access network 150, it is assumed that the cable modem 160 has undergone DOCSIS registration and the baseline privacy key exchange prior to the provisioning process described below. The cable modem 160 thus has a secure channel with the CMTS 155 at the head end. It is assumed that the network infrastructure beyond the head end is a managed backbone for which reasonable security precautions have been taken, e.g. to secure servers. The provisioning server 140 itself, since it manages keys, must be very well secured. Nevertheless, it is assumed that the BTI 170 cannot trust signals on the cable. That is, the threat model includes the possibility that a hostile intruder can masquerade as the cable head-end and fool the BTI into believing it is communicating with a legitimate service provider.

In accordance with an embodiment of the present invention, cryptographic means are advantageously utilized to authenticate the service provider. The objective of the provisioning process is for the service provider to securely establish an association between a customer account and a cryptographic key, where the key is available only to the BTI (and the provisioning server). The key can be used to authenticate key exchanges later. In practice, where the key is a symmetric key, this means that the two sides share a string of random bits that can be used as encryption and keys for message authentication codes (MAC). It is common to use different keys to encrypt and MAC in each direction, so if a 128-bit cipher is used, the provisioning scenario will result in at least 512 bits of shared random bits. Note that the cryptographic key can be a public key rather than a symmetric key, where the corresponding private key is stored in the BTI.

The service provider, SP, is assumed to have a public/private key pair. The private key is stored in a safe place and there are strict procedures for accessing this key. The public key, $K_{SP+}$, is stored in the memory of the BTI or built into the BTI, for example by burning the key into read only memory. If this public key turns out to be source of attack (e.g. attackers successfully substitute a rogue key into BTIs in a particular area and manage to spook the provisioning server), then the key can be further protected by storing it in tamper-resistant storage. It is advantageous that there be a public key infrastructure whereby the service provider issues public key certificates for the provisioning servers, e.g. PS. There can be several layers of hierarchy in practice. It is assumed that the private key for the provisioning server is stored somewhere inside the network, and that when the BTI sends a message to the provisioning server, it is communicating with a secure location inside the network.

The user obtains and installs the BTI, whether by merely plugging the device in or by installing software on a computer. The user picks up the phone and dials a provisioning number (e.g. 611) to enable registration. In accordance with a preferred embodiment of the present invention, the following messages, as illustrated in FIG. 3, then take place. It should be noted that, in addition to or in lieu of the signatures indicated in FIG. 3, the values of the messages can be digitally signed or hashed, using a message authentication code (MAC) with each message. Different keys can be utilized in each direction with the protocol. Such details are not included for simplicity of exposition and would be known to one of ordinary skill in the art.

At step 301, the BTI 170 receives the provisioning number:

U→BTI:611

The BTI issues a SETUP message to the gate controller 110, which routes the call to a provisioning server 140 and returns a SETUP_ACK message containing the IP address of the provisioning server. The authentication information in the SETUP message from the BTI can be null.

At step 302, the BTI 170 announces its existence to the provisioning server 140

BTI→PS:yo!

and requests the certificate and public key from the provisioning server 140. At step 303, the provisioning server 140 provides its public key and certificate:

PS→BTI: $K_{PS+}$,CERT(PS,$K_{PS+}$)$_{S_{KSP-}}$

Certificates are convenient here because they allow the BTI to store a public key, here the service provider's public key, and have confidence in another public key (here, the provisioning server's public key) if it carries a certificate signed by the private key corresponding to the service provider's public key stored in the BTI.

At step 304, the BTI 170 generates random symmetric keys, SK, AK, and K and transmits the following message to the provisioning server 170:

BTI→PS: $\{SK, AK, N_0\}_K$, $\{info\}_{SK}$, $\{K\}_{K_{PS+}}$

K is used to encrypt the message that is sent with a symmetric cipher. K itself is encrypted with the public key of PS to make sure nobody else can read it. SK is a session key that will be used for future communication with the provisioning server 170 for the remainder of the provisioning. AK is a symmetric key that is used to secure the audio channel. In practice, AK may actually be a master key used to generate the actual keys used for encryption and to generate message authentication codes (MAC). No is a random nonce (a one-time identifier) used to prevent replay attacks (it is possible to avoid using nonces by including a hash of the received (challenged) message in every response). The reply from PS will contain $N_0$ as well to link the two messages together. info contains the information in the message, such as the network address (Media Access Control address, IP address, etc.) of the broadband telephony interface 170.

At step 305, the provisioning server 140 acknowledges the registration request and proves knowledge of the session key:

PS→BTI: $\{ACK, N_0, N_1\}_{SK}$

At this point, the session key is "good" and the network associates it with the particular IP endpoint.

At step 306, the BTI 170 sets up a voice connection with the provisioning server 140 and uses the audio channel key, AK, to secure the voice path. In practice, the audio stream should be encrypted and protected using message authentication codes. For simplicity, the secure messages, M, on the audio channel are represented as $\{M\}_{AK}$. A this point, the BTI 170 completes the setup of the voice connection to the provisioning server 140.

At step 307, the provisioning server 140 prompts the user for her authentication information:

PS→U: $\{\text{"enter auth info"}\}_{AK}$

The authentication information can be implemented in many different ways. For example, the authentication information can be a work order number that has been given to a customer (or to an installer) after the customer has subscribed for the service. The work order must be supplied when the BTI is provisioned to identify the customer account. As another example, the authentication information can be a credit card number, address, etc. that is provided by the user who subscribes for the service during the provisioning call itself. The audio stream is secured using AK from the PS 140 to the BTI 170, which converts it to an analog voice for the user.

At step 308, the user speaks or dials her authentication information in response to the prompt:

U→BTI:auth info

At step 309, the BTI 170 sends the authentication information over the secure audio channel to the provisioning server 140.

BTI→PS: $\{\text{auth info}\}_{AK}$

At step 310, the BTI 140 generates a public/private key pair for the user and sends the public key, $K_{U+}$, to the provisioning server 140.

BTI→PS: $\{N_1, N_2, K_{U+}\}_{SK}$

The provisioning server 140 associates the authentication information sent over the secure audio channel with the public key, $K_{U+}$, sent over the secure control channel. The PS 140 can do this because (a) it is aware that both came from the same network address and (b) it successfully authenticates and decrypts both the audio and control channel information using the keys, AK and SK, which the PS knows are associated with the same broadband telephony interface 170. The PS 140 stores the BTI's public key for later usage and acknowledges receipt:

PS→BTI: $\{ACK, N_2\}_{SK}$

At this point, the user is provisioned. The BTI 170 and the provisioning server 140 share a long-term symmetric key that the provisioning server can associate with the subscriber account. In practice, the BTI and PS may share up to 512 random bits to comprise four 128-bit encryption and MAC-ing keys, as described above. In future sessions, the BTI 170 can generate a session key, sign it, and send it under the public key of the provisioning server 140 or the long-term key it shares with the server in a similar manner. No interaction from the user is necessary to establish these future session keys.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of provisioning a user's broadband telephony interface comprising, in order, the steps of:
    receiving information authenticating to the user's broadband telephony interface a provisioning server;
    establishing a communication channel between the user and the provisioning server over which is transmitted authorization information from the user to the provisioning server; and
    encrypting and transmitting a cryptographic key associated with the user to the provisioning server.

2. A method of employing a user's broadband telephony interface (BTI), executed in said BTI in communication with a network, comprising, in order, the steps of:
    sending a request to a provisioning server;
    receiving a message that includes a key of said provisioning server and information that authenticates said provisioning server to said user's BTI;
    generating a random key K and its complement, a random session key SK and its complement, and a random audio channel key AK and its complement, where a complement of a key J is a key that decrypts messages message encrypted with said key J;

sending a message to said provisioning server information that includes said complement of said K encrypted with said key of said provisioning server, and a tuple encrypted with said K, which tuple includes said complement of said SK, and said complement of said AK; and receiving an acknowledgement from said provisioning server.

3. The method of claim 2 further comprising the step of establishing a voice connection between said user and said network.

4. The method of claim 3 further comprising said provisioning server sending a request to said user, over said voice connection, encrypted with said complement of said key AK.

5. The method of claim 4 further comprising the steps of:
relaying said request to said user;
receiving responsive information from said user; and
forwarding said responsive information to said provisioning server, encrypted with said key AK.

6. The method of claim 5 further comprising the steps of:
generating a public/private key pair; and
sending the generated public key to said provisioning server, encrypted with said key SK.

7. The method of claim 6 further comprising the step of receiving an acknowledgement message from said provisioning server, in response to said sending of the generated public key, which acknowledgement message is encrypted with said complement of said key SK.

8. The method of claim 3 wherein the communication channel passes through said BTI.

9. The method of claim 8 wherein said key of said provisioning server is a public key.

10. The method of claim 9 wherein said acknowledgement is encrypted with said complement of said key SK.

11. The method of claim 10 wherein a random nonce is included in said tuple.

12. The method of claim 2 wherein the information that authenticates the provisioning server is a digital certificate.

13. The method of claim 2 wherein any number of said keys taken from the set consisting of K, AK, and SK are symmetric keys, where a symmetric key is equal to its complement.

14. The method of claim 2 wherein said complement of said key K is a public key and said key K is a private key.

15. The method of claim 2 wherein a hash is included with each transmission.

16. The method of claim 2 wherein said step of sending to said provisioning server includes information encrypted with said key SK.

17. The method of claim 16 wherein said information encrypted with said key SK provides an address of said BTI.

18. Apparatus comprising:
a first interface to a landline user telephone;
a second interface to a communication network with access to a provisioning server;
memory for storing cryptographic keys;
a processor connected to the memory and the first and second interfaces for executing program instructions, the program instructions causing the processor to perform, in order, the steps of:
receiving a key of said provisioning server and information authenticating the provisioning server to said user telephone;
generating a random key K and its complement, a random session key SK and its complement, and a random audio channel key AK and its complement, where a complement of a key J is a key that decrypts messages message encrypted with said key J; and
sending to said provisioning server information that includes said complement of said K encrypted with said key of said provisioning server, and a tuple encrypted with said K, which tuple includes said complement of said SK, and said complement of said AK.

19. The apparatus of claim 18 wherein the processor also generates a public/private key pair, and sends the public key to said provisioning server.

20. The apparatus of claim 18 wherein the processor establishes a session communication channel with said provisioning server.

21. The apparatus of claim 20 wherein the processor communicates with said provisioning server over said session communication channel by sending messages encrypted with said key SK, and receiving messages encrypted with said complement of said key SK.

22. The apparatus of claim 18 wherein a random nonce is included in said tuple.

23. The apparatus of claim 18 wherein the information authenticating the provisioning server is a digital certificate.

24. The apparatus of claim 18 wherein the key K a symmetric key.

25. The broadband telephony interface of claim 18 wherein a hash is included with each transmission.

* * * * *